United States Patent [19]

Kajisono

[11] Patent Number: 5,336,399
[45] Date of Patent: Aug. 9, 1994

[54] APPARATUS FOR PURIFYING AND ACTIVATING WATER

[76] Inventor: Takekazu Kajisono, 259-13-15-102, Kamihirose, Sayama-shi, Saitama-ken, Japan

[21] Appl. No.: 869,378

[22] Filed: Apr. 16, 1992

[30] Foreign Application Priority Data

Dec. 27, 1991 [JP] Japan .................. 3-347172

[51] Int. Cl.5 ............ B01F 3/04; C02F 1/74; C02F 7/00
[52] U.S. Cl. ............ 210/169; 210/170; 210/242.2; 210/220; 210/243; 210/178; 210/179; 210/221.1; 261/87; 261/93; 261/120; 261/140.1; 261/141; 261/DIG. 42; 366/102; 366/107; 119/215; 119/263
[58] Field of Search ............ 210/170, 192, 242.2, 210/243, 220, 219, 221.1, 169, 178, 179; 261/120, 87, DIG. 42, 93, 141, 140 R, 121.1; 366/102, 107; 119/215, 263

[56] References Cited

U.S. PATENT DOCUMENTS

| | | | |
|---|---|---|---|
| 1,983,701 | 12/1934 | Lewis | 209/169 |
| 2,733,056 | 1/1956 | Marky | 261/87 |
| 2,892,543 | 6/1959 | Daman | 261/87 |
| 3,775,307 | 11/1973 | McWhirter | 261/120 |
| 3,778,233 | 12/1973 | Blough | 261/87 |
| 3,779,531 | 12/1973 | White | 261/120 |
| 3,810,548 | 5/1974 | Blough | 210/242.2 |
| 4,070,423 | 1/1978 | Pierce | 210/242.2 |
| 4,117,044 | 9/1978 | Durda | 261/93 |
| 4,166,086 | 8/1979 | Wright | 261/93 |
| 4,333,829 | 6/1982 | Walther | 261/120 |
| 4,676,654 | 6/1987 | Fleckner | 261/87 |
| 4,817,561 | 4/1989 | Byrne | 210/169 |
| 4,844,816 | 7/1989 | Fuchs | 261/87 |
| 4,863,594 | 9/1989 | Pedretti | 210/220 |
| 5,110,510 | 5/1992 | Norcross | 210/242.2 |
| 5,118,450 | 6/1992 | Chiu | 210/242.2 |

FOREIGN PATENT DOCUMENTS

| | | | |
|---|---|---|---|
| 2618838 | 11/1977 | Fed. Rep. of Germany | 261/93 |
| 203693 | 11/1984 | Japan | 261/87 |
| 190295 | 9/1985 | Japan | 261/87 |
| 227892 | 11/1985 | Japan | 261/87 |

Primary Examiner—Thomas M. Lithgow
Attorney, Agent, or Firm—Tarolli, Sundheim & Covell

[57] ABSTRACT

An apparatus for purifying and activating water is provided. The apparatus comprises a drive shaft having a hollow inside, a capsule secured to a lower end of the drive shaft, a device for supporting the drive shaft for rotation so that an upper opening of the drive shaft is positioned above the surface of water and the capsule is positioned in the water, and a motor for rotationally driving the drive shaft, the capsule including a plurality of small apertures communicating with the hollow inside of the drive shaft.

11 Claims, 5 Drawing Sheets

APPARATUS FOR PURIFYING AND ACTIVATING WATER

BACKGROUND OF THE INVENTION

1. Field of the Invention

The present invention relates to an apparatus for purifying and activating water by effectively retaining air in water for a long period of time.

2. Description of the Prior Art

For purifying water in nurseries or farms for growing fishes and shellfishes and in water-culturing plants, an apparatus is known which supplies air to pipings immersed in water by means of a compressor or blower so as to eject the air as bubbles into water through a plurality of small apertures provided at one end of the piping. An apparatus is also known which includes a waterwheel located at a position adjacent to the surface of water and driven for example by a motor to generate water splashes, so as to supply water with a large amount of bubbles. Recently, a submerged pump of a self-suction type and jet pump are also known.

Such conventional apparatus, however, can merely provide water with bubbles having a relatively large particle size. Thus, bubbles generated by such apparatus have a relatively large buoyancy and for this reason they easily go up to the surface of water in a short time. Retention time of such bubbles in water is therefore insufficient to purify water concerned.

A nursery or farm for eels in particular requires high purification performance since, in such a place, it is not desirable to supply water frequently. The above apparatus do not meet such a requirement. That is to say, such apparatus could not sufficiently purify water in a nursery for eels even when they had been operated continuously, so that various inconveniences have resulted from toxic substances generated from remaining bait or body waste discharged from eels.

SUMMARY OF THE INVENTION

Accordingly, it is a main object of the invention to provide an apparatus for purifying and activating water which may produce bubbles capable of being retained in water for a prolonged period of time for purification and activation of water.

In order to achieve the above object, the present invention provides an apparatus for purifying and activating water which comprises an outer casing having an upper opening positioned above the surface of water, a drive shaft rotatably mounted within the outer casing in concentric relationship with the outer casing, the drive shaft having a length larger than that of the outer casing, and means for rotatably driving the drive shaft.

In order to efficiently generate bubbles capable of being retained or held in water for a prolonged period of time, the drive shaft is designed to have a hollow construction. The drive shaft is provided, at the lower end thereof, with a capsule having a plurality of small apertures in the circumference thereof for ejecting air therefrom. The capsule includes a closed bottom and is attached to the lower end of the drive shaft in a concentric relationship with the drive shaft. The drive shaft is also provided at the upper end thereof with an impeller for drawing air into the hollow inside thereof.

According to one preferred embodiment of the invention, the drive shaft is provided in the circumference thereof with a groove helical extending around the circumference of the drive shaft, so as to facilitate purification of water.

According to another embodiment of the invention, the apparatus includes an ozone generator mounted at a position adjacent to the upper opening of the outer casing, so as to enhance sterilization and deodorization effects.

According to a further embodiment of the invention, a heat generator is mounted at a position adjacent to the upper opening of the outer casing, so as to avoid temperature of water to be treated from decreasing, when the apparatus is used in cold districts.

According to another embodiment of the invention, means for generating cold fluid is mounted at a position adjacent to the upper opening of the outer casing, so as to avoid temperature of water to be treated from increasing, when the apparatus is used in hot districts.

The apparatus of the invention operates as follows. When the drive shaft is rotated by the driving means at a high speed, negative pressure is generated in the area adjacent to the lower end of the outer casing. Due to this negative pressure, air is induced or drawn into the hollow inside of the drive shaft and a space between the drive shaft and outer casing through the upper opening of the drive shaft and upper opening of the outer casing, respectively. Such air is discharged from the lower opening of the outer casing and the lower opening of the drive shaft and is distributed in water as a large number of small bubbles, i.e., micro-bubbles. The bubble are very small in diameter so that they may be retained or suspended in water for a long period of time.

BRIEF DESCRIPTION OF THE DRAWINGS

For a better understanding of the invention, and to show how the same may be carried into effect, reference will now be made, by way of example, to the accompanying drawings in which like reference numerals refer to like elements.

DETAILED DESCRIPTION OF THE PREFERRED EMBODIMENTS

An apparatus for purifying and activating water in accordance with the invention will be explained in detail hereinbelow with reference to the drawings illustrating several embodiments of the invention.

The purification and activation apparatus of the invention may be used at a place, such as a contaminated sea, lake or pond, where purification of water should be performed in a floatingly supported manner. The apparatus is particularly suitable for use in a nursery or farm where fishes, shellfishes or lavers are grown.

Figure 1:
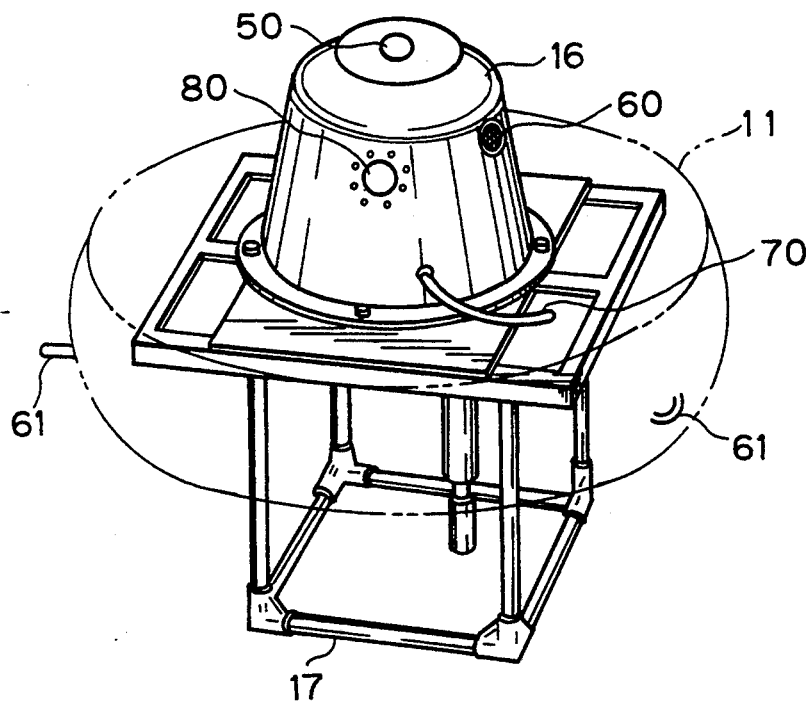
FIG. 1 is a perspective view of an apparatus for purifying and activating water in accordance with the invention.
Figure 2:
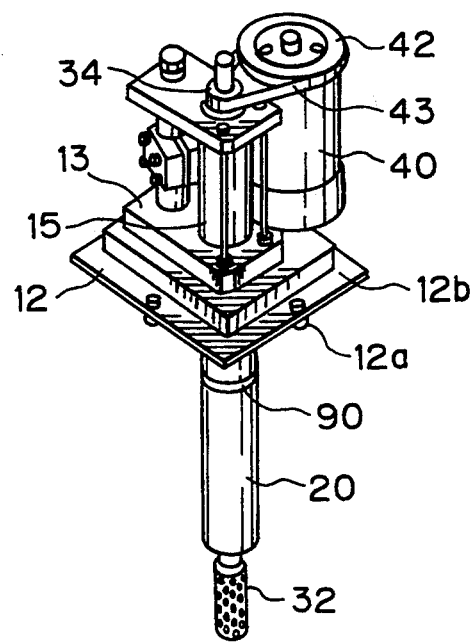
FIG. 2 is a perspective view illustrating main part of the apparatus in FIG. 1.
Figure 3:
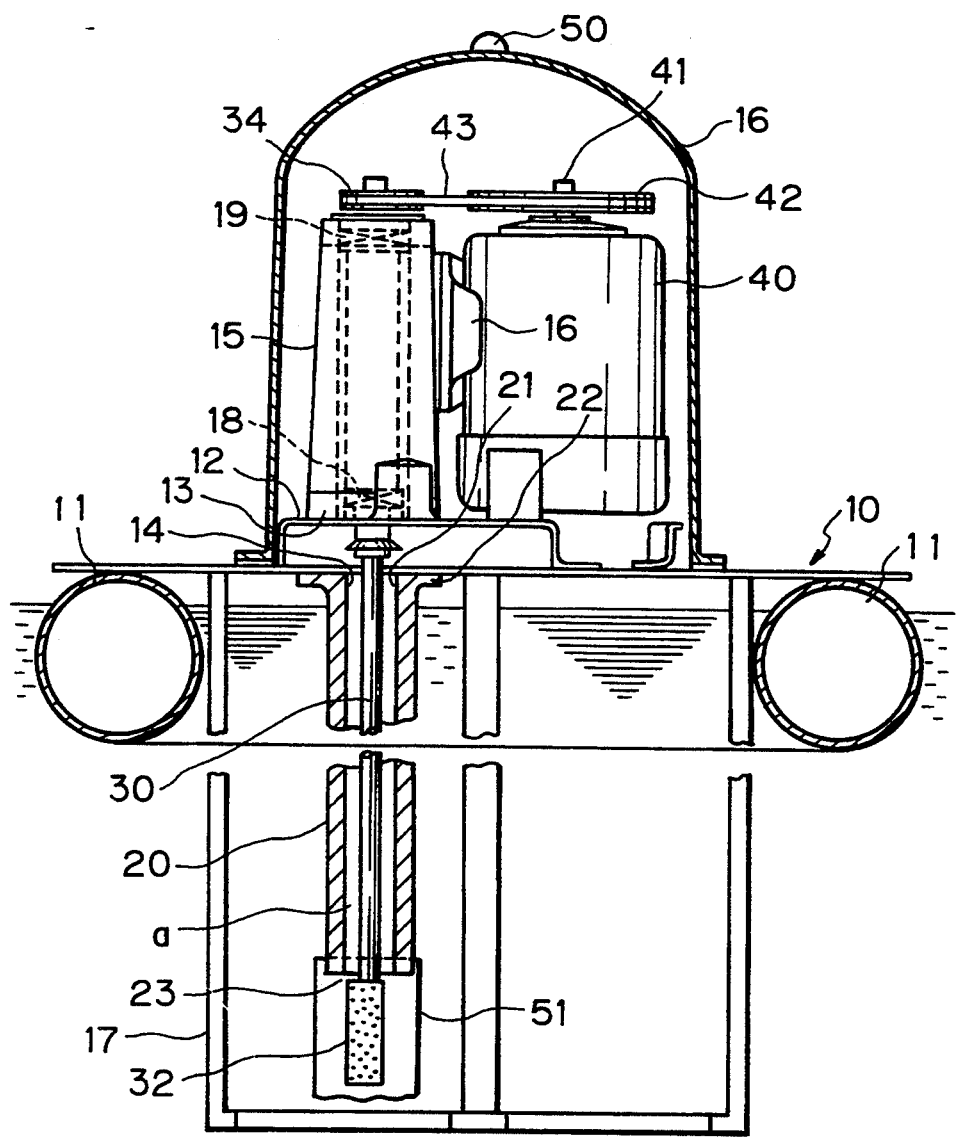
FIG. 3 is an enlarged front view of the apparatus for purifying and activating water according to the invention, with a portion thereof fragmented and a portion thereof omitted.

The purification and activation apparatus of the invention includes, as shown in FIGS. 1 to 3, a base plate 10 adapted to float on water with the aid of a float member 11, an outer casing 20 of a substantially cylindrical shape supported by the base plate 10 and having an upper opening 21 located above the surface of the water, a drive shaft 30 rotatably mounted within the outer casing 20 in concentric relationship therewith, the drive shaft being of a hollow construction and having a length larger than that of the outer casing 20, and a drive means such as a motor 40 for rotatively driving the drive shaft 30.

A base 12 is secured to the upper surface of the base plate 10 by means of a tightening screw 12b through a cushion member 12a, as shown in FIG. 2. A bearing support 13 is secured to the upper surface of the base 12. Preferably, the base 12 and base support 13 are integrally formed by casting.

The outer casing 20 includes a flange 22 at the upper periphery thereof. The flange 22 is fixed to the lower surface of the base plate 10 by means of screws (not shown) so that the upper opening 21 of the outer casing 20 is aligned with a through hole 14 formed in the base plate 10. The outer casing is preferably formed from PVC (polyvinyl chloride).

The outer casing 20 is provided with a water level indicator 90, as shown in FIG. 2.

Figure 4:
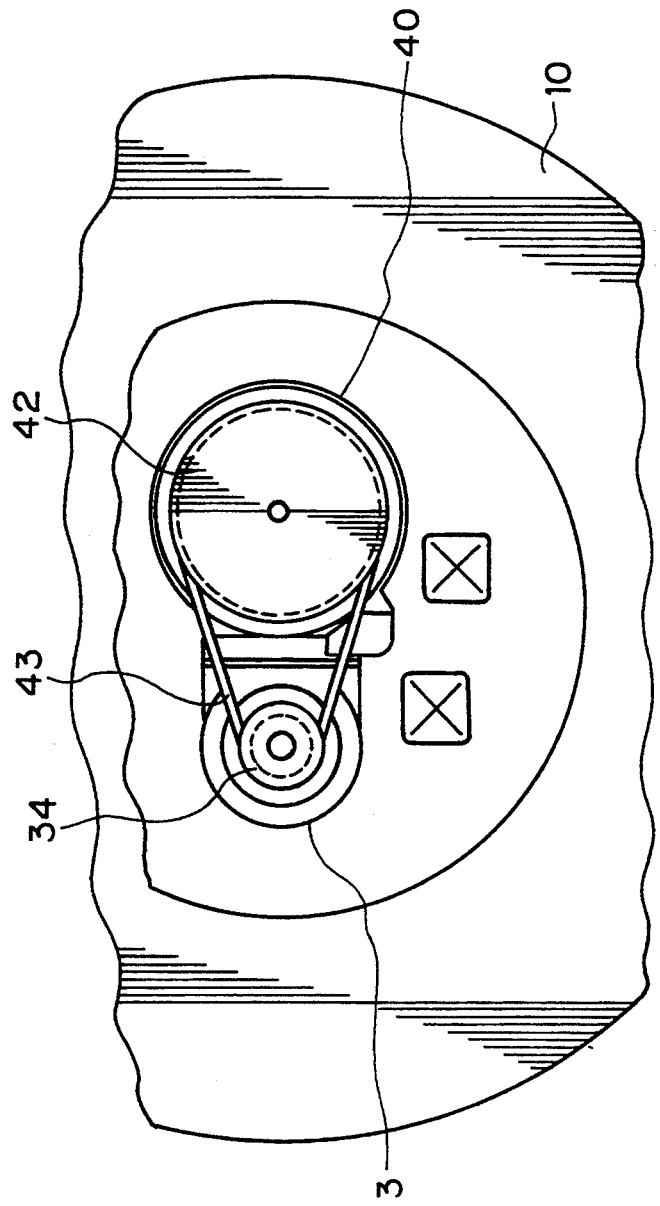
FIG. 4 is a plan view of the apparatus shown in FIG. 3.
Figure 5:
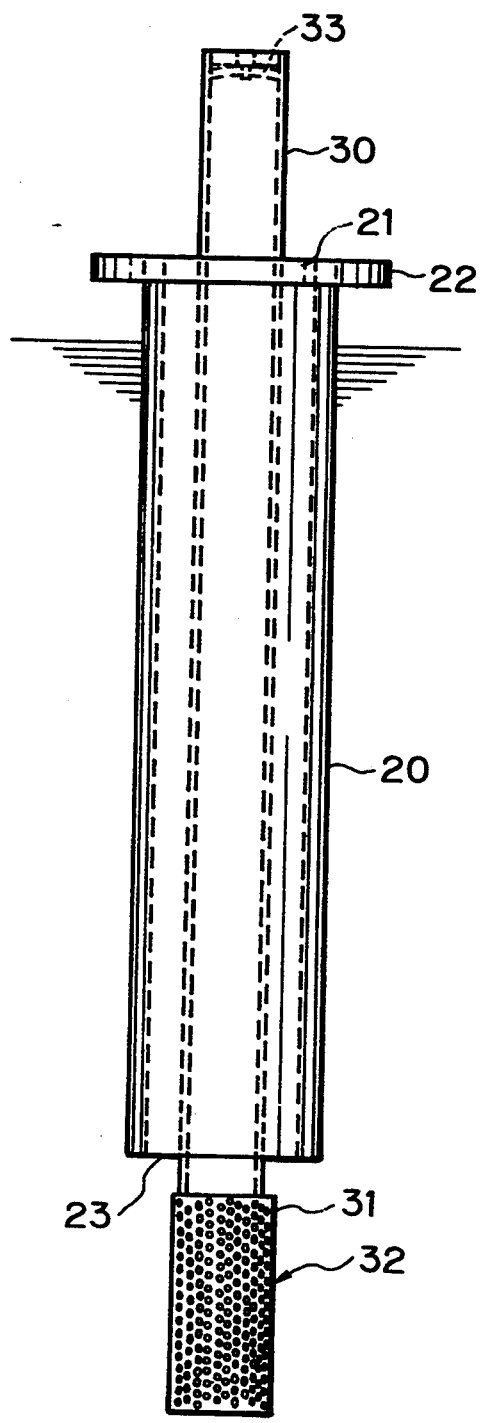
FIG. 5 is a side view illustrating an outer casing and drive shaft.
Figure 6:
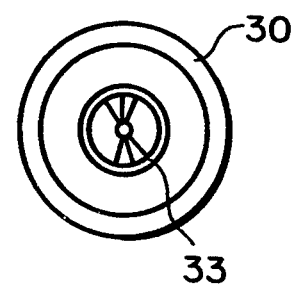
FIG. 6 is a plan view of the apparatus in FIG. 5.

The lower end of the drive shaft 30, which extends to a short distance downwardly from a lower opening 23 of the outer casing 20, is provided with a capsule 32. The capsule 32 is in a form of a cylinder with a closed bottom and is attached to the lower end of the drive shaft 30 in a concentric manner therewith. The capsule 32 includes a plurality of small apertures 31 in the circumferential wall thereof. The apertures 31 allow gas flowing therethrough. The drive shaft 30 is provided at the upper opening thereof with a propeller 33 for inducing air into the passage of the drive shaft 30. See FIGS. 3 and 4. It is to be noted that the propeller 33 is not essential to the apparatus of the invention. The drive shaft 30 extends through the upper opening 21 of the outer casing 20, through hole 14 the base 12 and opening in the base plate 10, so that the upper end of the drive shaft protrudes upwardly from the base 10. The upper end portion protruding from the base 12 is rotatably supported by a pair of spaced apart bearings 18, 19 disposed within a bearing box 15 secured to the bearing support 13. Accordingly, the drive shaft can be rotatably driven by the motor 40 in a stable manner without generating undesirable vibrations.

The distance a between the outer casing 20 and the drive shaft 30 is suitably determined so that air could be introduced into a space between the outer casing and the drive shaft. The plurality of small apertures 31 of the capsule 32 are arranged so that they are spaced relative to one another in the circumferential direction of the capsule and extend along a plurality of helical lines spaced apart relative one another in the axial direction of the capsule. Each aperture 31 is appropriately sized so as to produce very small air bubbles.

The motor 40 is securely attached to a bracket 16 (support for the motor) which, in turn, is fixed to the bearing box 15. A shaft 41 of the motor 40 has attached thereto a pulley 42. Similarly, the drive shaft 30 has, at the upper end thereof protruding upwardly from the bearing box 15, a pulley 34 of a diameter smaller than that of the pulley 42. The pulleys 34, 42 are drivingly connected by means of a driving belt. The motor 40 has a rating of 2.2 amps. at 200 volts A.C. and speed of 8,000 rpm. The ratio in diameter of the larger pulley 42 to smaller pulley 34 is 2:1 or more. Accordingly, the drive shaft 30 will be rotated at a speed of at least 10,000 rpm.

The base plate 10 is provided with a cover 16 for enclosing the motor 40 in a water resistant manner. A frame 17 including a plurality of legs is secured to and extends from the lower surface of the base plate 10. The frame 17 extends downwardly past the lower surface of the capsule in order to prevent the capsule and outer casing from contacting the bottom of the water when the surface of the water descends.

A protective casing 51 is attached to the lower end of the capsule 32 and encircles the capsule. The protective casing 51 is formed from a mesh material or net in order to avoid the small apertures 31 of the capsule blocked with foreign materials or dusts.

The water resistive cover 16 is provided with a lamp 50 which will indicate the fact whether the motor 40 is running or stopped. The water resistive cover 16 includes an inlet 60 for air and an inspection hole 80 for allowing an operator to view inside the cover. It is noted that reference numeral 70 designates a power cable for the motor 40.

In the illustrated embodiment, the float 11 comprises a tank which has been formed from a length of PVC material into a doughnut or annular configuration (similar to a tire tube). The tank is designed to be able to keep the base plate 10 and motor 40 mounted on the tank to be floated in a stable manner. A plurality of anchor portion 61 are provided in the periphery of the float 11, which cooperate with anchor chains (not shown) connected thereto to prevent the float 11 from being drifted away.

The float 11 may be provided, along the periphery thereof, with additional floats of ball-shaped configuration.

Figure 7:
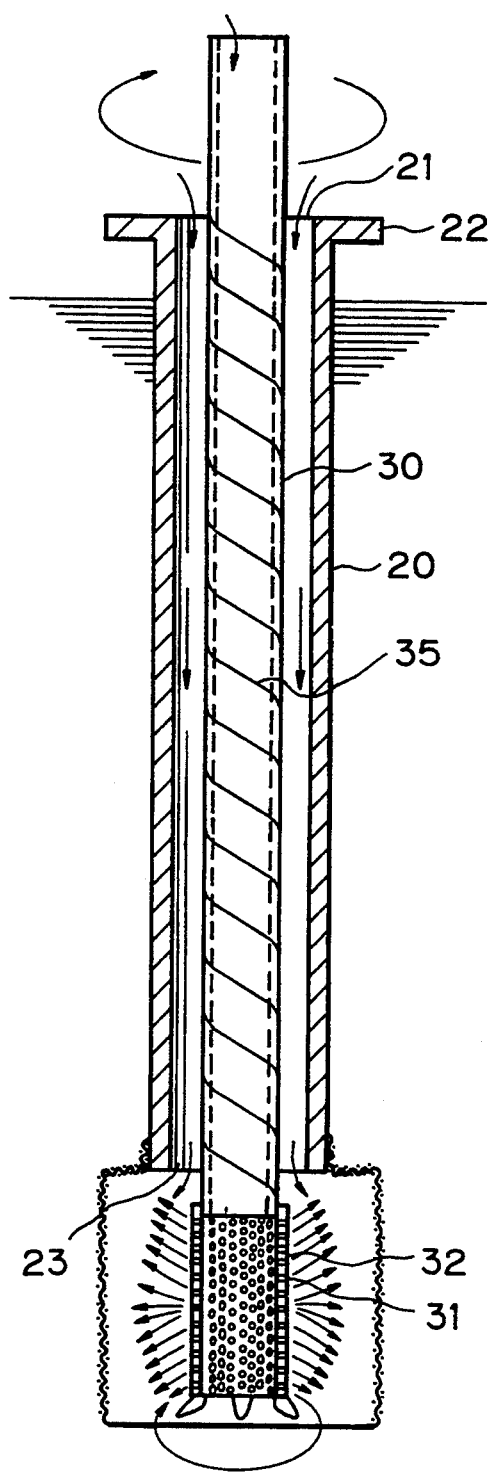
FIG. 7 is a side view similar to FIG. 3, illustrating another embodiment of the invention.

The drive shaft 30 and capsule 32 may be formed, for example, from aluminium. The drive shaft 30 and capsule 32 may be connected together, for example by means of screw connection. Preferably, the diameter of the capsule is larger than that of the drive shaft. This is because, as will be explained in more detail below, the capsule may serve as a kind of propeller to cause negative pressure in the vicinity of the lower end of the outer casing when the drive shaft is rotated at a high speed. Accordingly, it is preferable to provide impellers, as shown in FIG. 7, so as to cause increased negative pressure.

Means for generating static electricity is also provided. The means for generating static electricity serves to ionize water. In the illustrated embodiment, the static electricity generating means is designed to generate static electricity due to contact between the outer peripheral surface of the drive shaft 30 rotating at a high speed and air in a space defined between the outer casing 20 and drive shaft 30, the air of course being electrically insulative.

Operation of the apparatus for purifying and activating water according to the invention will be explained hereinbelow.

When the motor 40 is energized, rotation of the motor 40 is transmitted through the pulleys 42, 34 and through the driving belt 43 to the drive shaft 30. Thus, the drive shaft 30 will be rotated at a high speed of 10,000 rpm or more.

Rotation of the drive shaft 30 also causes rotation of water present in a passage 35 of the drive shaft 30, whereby the water in the passage will be ejected through the small apertures 31 of the capsule 32 by reason of the centrifugal force of the water. At the same time, fresh air will be drawn into the passage 35 from the upper end of the drive shaft 30 by the aid of the propeller 33. The fresh air having been drawn into the passage 35 will be ejected vigorously from the small apertures 31 to form bubbles in the water. High speed rotation of the capsule generates negative pressure in the vicinity of the lower end of the outer casing 20, so that air is drawn into the space between the outer casing and the drive shaft through the upper opening of the outer casing. Ejection of the air from the small apertures 31 causes a water flow directing radially of the capsule 30 in a convolution manner at a position immediately below the upper opening 23 of the outer casing 20 and adjacent thereto. The water flow causes the water present between the drive shaft 30 and outer casing 20, together with the air introduced through the upper opening of the outer casing, to be ejected from the lower opening 23 of the outer casing 20. Fresh air is continuously drawn into the space between the drive shaft 30 and the outer casing 20 from the upper opening 21 of the outer casing 20, so as to be vigorously ejected from the lower opening 23 of the outer casing 20, thereby providing an increased amount of air bubbles in addition to the bubbles ejected from the capsule.

As a result, bubbles from the lower opening 23 of the outer casing 20 and from the capsule are miniaturized or broken into smaller sizes for aeration. A quite large amount of such miniaturized bubbles (micro-bubbles) is distributed in water over a wide range. The size or diameter of the micro-bubbles is very small and may range from 1/1000 mm to 3/1000 mm. Accordingly, such micro-bubbles have a relatively small buoyancy, which means that they may be suspended or retained in water for a prolonged period of time. The micro-bubbles have a quite low tendency to be combined together in water, so that they may remain independent or individualized in water for a long period of time. The micro-bubbles are distributed deep in water and over a wide range and retained in water for a prolonged period of time. This enables oxygen and nitrogen in the bubbles to be contacted with and dissolved in water, so as to decompose toxic gases or organic substances such as ammonia for elimination thereof. Thus, the apparatus of the invention has a high capability of purifying water in a nursery or farm for fishes, and water for hydroponics, thereby facilitating growth of fishery products or plants.

The air introduced into the space between the drive shaft 30 and outer casing 20 is charged with static electricity due to its frictional contact with the outer circumferential surface of the drive shaft 30. The micro-bubbles will be broken or collapse after a long period of time in water. The bubbles, upon collapse thereof, generate ultrasonics. The static electricity generated as mentioned above may establish electric potential in water, thus causing electrolytic dissociation or ionization of water to produce cationic ions $H^+$ and anionic ions $OH^-$. The peripheral surface of the drive shaft is most strongly charged with negative static electricity, so that cationic ions $H^+$ in water are adsorbed to the outer peripheral surface of the drive shaft. Accordingly, cationic ions $OH^-$ are relatively increased in water, thus providing alkali-ion water. It has been found that hands smeared with grease may be easily cleaned without the use of any soap, when putting the hands into water obtained by the apparatus of the invention and rubbing them together. This, we believe, is because that the alkali-ionized water is able to cover grease on the hands and to remove it from the hands. Thus, the water purified and activated by the apparatus of the invention has effects of antibacterial action and growing plants rapidly.

It is generally difficult for the drive shaft 30 to be rotated at a speed of 10,000 rpm or more. When it is intended to restrict vibration of the drive shaft when rotating at such a high speed, a manufacturing cost may be increased to a significant value. Such a problem may be solved by the use of the outer casing 20. That is to say, the outer casing 20 serves as a water bearing or air bearing during high speed rotation of the drive shaft 30, thus restricting or relieving vibrations of the drive shaft.

FIG. 7 is a side view of another embodiment of the invention, illustrating an outer casing and drive shaft employed therein.

Referring to FIG. 7, the drive shaft 30 is provided, in the circumferential surface thereof, with a groove 35 extending helically around the circumferential surface. Provision of the helical groove 35 may increase frictional force between the drive shaft and air to be drawn into the space between the drive shaft and the outer casing. This may result increased amount of static electricity in air to be drawn, thereby facilitating activation of water.

An ozone generator may be attached to a position adjacent to the upper opening 21 of the outer casing. In this way, fresh ozone having a strong bactericidal action may be quickly supplied to water so as to sterilize water.

A heating member such as an electric heater may be provided at a position adjacent to the upper opening 21 of the outer casing 20 so as to increase temperature of water in a quite natural way. This contributes to prevention of water temperature from decreasing when the apparatus is used in cold districts.

A device for generating cold air such as a cooler may be provided at a position adjacent to the upper opening 21 of the outer casing 20 so as to decrease temperature of water in a quite natural way. This contributes to prevention of water temperature from increasing when the apparatus is used in hot districts.

The invention should not be limited to the above embodiments. For example, the size and/or quantity of the small apertures 31 of the capsule 32 may be appropriately selected depending upon particular application of the apparatus of the invention.

It is recognized that there is a certain relationship between workload per unit time required for producing micro-bubbles of a size ranging from 1/1000 mm to 3/1000 mm and mechanical factors, such as a diameter and axial length of the drive shaft 30, number of rotations of the drive shaft 30, a gap or clearance between the circumference of the drive shaft 30 and outer casing 20, an axial length of the outer casing 20, and a driving power of the motor 40. Thus, an outer diameter and axial length of the drive shaft 30 may be determined on the basis of the above relationship.

The apparatus of the invention may also be used in swimming pools, sewage treatment plants, rivers, lakes, lagoons or the like for purification of water. The apparatus of the invention may further be used in order to perform activation, purification and/or softening of drinking water, water for breweries, water in water reservoirs or the like.

As will be appreciated from the foregoing, the apparatus according to the invention is capable of producing micro-bubbles which may be distributed in water and retained therein for a long period of time, so as to facilitate purification and/or activation of water.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the spirit of the present invention. Accordingly, the foregoing detailed description should be exemplary in nature and not limited to the scope and spirit of the invention set forth in the appended claims.

What is claimed is:

1. An apparatus for injecting gas into a body of water having a surface, said apparatus comprising;

a base;

float means connected with said base for supporting said apparatus base in a position floating on the water surface and with said base extending generally parallel to and above the water surface;

a non-rotatable outer casing fixed to said base and projecting from said base in a direction transverse to said base and downward into the water from the water surface when said apparatus is floating on the water surface, said outer casing having an axis extending generally vertically when said apparatus is floating on the water surface, said outer casing having upper and lower end portions and a cylindrical inner surface;

a rotatable inner shaft disposed within said outer casing in a coaxial relationship with said outer casing, said inner shaft having upper and lower end portions and a cylindrical outer surface;

bearing means connected with said base and supporting said inner shaft for rotation relative to said base;

said cylindrical inner surface of said outer casing and said cylindrical outer surface of said inner shaft defining between them an annular outer gas flow passage extending axially between said inner shaft and said outer casing, said outer gas flow passage for receiving therethrough a downwardly flowing first gas flow for injection into the water;

said outer gas flow passage having a first gas inlet opening disposed in air above the water surface when said apparatus is floating on the water surface, said outer gas flow passage having a first gas outlet opening disposed in water below the water surface when said apparatus is floating on the water surface;

said inner shaft having an inner surface defining an inner gas flow passage extending axially through said inner shaft, said inner gas flow passage for receiving therethrough a downwardly flowing second gas flow for injection into the water;

said inner gas flow passage having a second gas inlet opening disposed in air above the water surface when said apparatus is floating on the water surface;

said inner shaft lower end portion projecting in the water below said outer casing lower end portion;

said inner gas flow passage terminating in a gas outlet chamber at least partially defined by a cylindrical capsule fixed for rotation with said inner shaft, said capsule including surfaces defining a plurality of second gas outlet openings extending radially from said chamber through said capsule for injecting said second gas flow into the water; and means for generating negative pressure adjacent to said lower end portion of said outer casing, comprising a motor connected with said base and with drive shaft for rotating said drive shaft and said capsule about said axis to thereby generate negative pressure adjacent to said lower end portion of said outer casing to draw gas into said first gas inlet and through said first gas flow passage and to draw gas into said second gas inlet and through said second gas flow passage.

2. An apparatus as set forth in claim 1, wherein said second gas outlet openings have a size in a range of about 1/1000 mm to about 3/1000 mm.

3. An apparatus as set forth in claim 1 wherein, said bearing means comprising first and second bearings disposed above and spaced from said outer casing, said apparatus being free of bearings within said outer casing.

4. An apparatus as set forth in claim 1 wherein said rotating cylindrical outer surface of said inner shaft includes means to generate static electricity in said first gas flow.

5. An apparatus as set forth in claim 1 further comprising impeller means for drawing air into said inner gas flow passage upon rotation of said inner shaft, said impeller means being fixed for rotation with said upper end portion of said inner shaft and being disposed in air above the water surface when said apparatus is floating on the water surface.

6. An apparatus as set forth in claim 1 wherein said inner shaft is rotatable by said motor at a speed of about 10,000 rpm or more.

7. An apparatus as set forth in claim 1 wherein said outer surface of said inner shaft includes surfaces defining a helical groove extending around said inner shaft along the length of said inner shaft.

8. An apparatus as set forth in claim 1 further comprising an ozone generator connected with said base at a location adjacent to said first gas inlet opening of said outer casing for supplying ozone to said first gas inlet opening.

9. An apparatus as set forth in claim 1 further comprising means for heating said first gas flow, said means for heating being connected with said base at a location adjacent to said first gas inlet opening of said outer casing.

10. An apparatus as set forth in claim 1 further comprising means for cooling said first gas flow, said means for cooling being connected with said base at a location adjacent to said first gas inlet opening of said outer casing.

11. An apparatus as set forth in claim 1 wherein said cylindrical capsule having a diameter greater than the outer diameter of said inner shaft, said cylindrical capsule having a diameter less than the inner diameter of said outer casing.

* * * * *